United States Patent
Wu

(10) Patent No.: US 6,951,674 B1
(45) Date of Patent: Oct. 4, 2005

(54) BLENDED POLYURETHANE INTERVENTIONAL BALLOON

(75) Inventor: Show-Mean Wu, San Diego, CA (US)

(73) Assignee: SciMed Life Systems, Inc., Maple Grove, MN (US)

( * ) Notice: Subject to any disclaimer, the term of this patent is extended or adjusted under 35 U.S.C. 154(b) by 319 days.

(21) Appl. No.: 09/710,394

(22) Filed: Nov. 10, 2000

(51) Int. Cl.$^7$ .............................................. C08F 220/12
(52) U.S. Cl. ................. 428/35.7; 604/96.1; 604/103.6; 604/915
(58) Field of Search ............................... 428/35.7, 36.8

(56) References Cited

U.S. PATENT DOCUMENTS

| | | | |
|---|---|---|---|
| 4,303,573 A | 12/1981 | Ostapchenko | 260/40 R |
| 4,388,446 A | 6/1983 | Hornbaker et al. | 525/175 |
| 4,950,239 A | 8/1990 | Gahara et al. | 604/280 |
| RE33,561 E | 3/1991 | Levy | 428/36.92 |
| 5,500,180 A | 3/1996 | Anderson et al. | 264/532 |
| 5,506,300 A | 4/1996 | Ward et al. | 525/88 |
| 5,565,523 A | 10/1996 | Chen et al. | 525/176 |
| 5,587,125 A | 12/1996 | Roychowdhury | 264/515 |
| 5,814,705 A * | 9/1998 | Ward et al. | 525/88 |
| 5,871,468 A | 2/1999 | Kramer et al. | 604/96 |
| 5,964,778 A * | 10/1999 | Fugoso et al. | 606/194 |
| 6,210,364 B1 | 4/2001 | Anderson et al. | 604/96.01 |
| 6,284,856 B1 * | 9/2001 | Lee | 526/329.2 |

FOREIGN PATENT DOCUMENTS

EP           0362826 A2     4/1990      .......... A61M/25/10

* cited by examiner

*Primary Examiner*—Sandra M. Nolan-Rayford
(74) *Attorney, Agent, or Firm*—Vidas, Arrett & Steinkraus

(57) ABSTRACT

A combination of urethane polymeric components provides desired characteristics in forming medical instruments such as catheters and balloons for dilatation catheters. For example, a balloon material is formed form a blend of urethane polymeric components, including a first polymeric component having a first glass transition temperature and a second polymeric component having a second glass transition temperature. The first polymeric component can be branched or straight chain of thermoplastic polyurethane compound having a glass transition temperature polyurethane compound having a glass transition temperature higher than normal human body temperature. The second polymeric component can be a second thermoplastic polyurethane having a glass transition temperature equal to or lower than normal human body temperature. The polymeric blend can be heat treated to further enhance the properties or stability of the balloon material, including significantly increasing burst pressure.

27 Claims, 2 Drawing Sheets

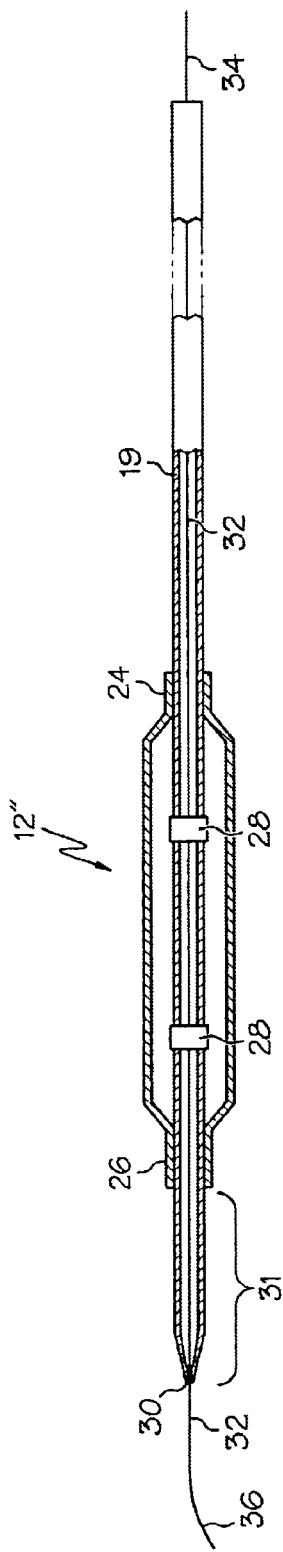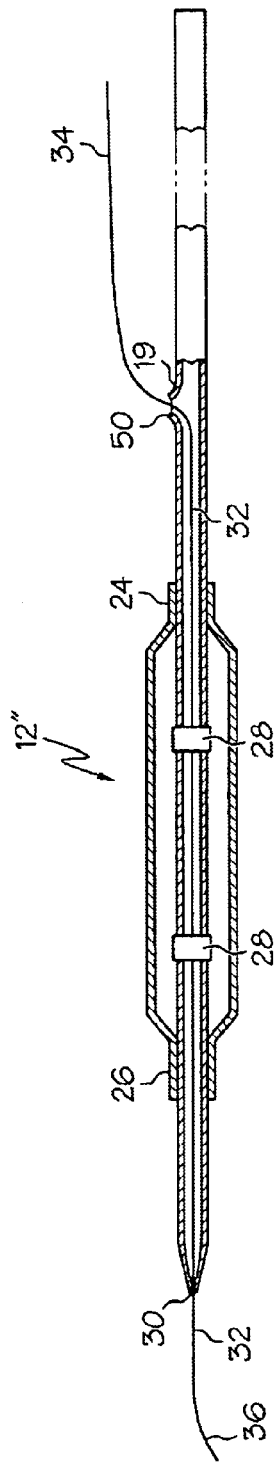

BLENDED POLYURETHANE INTERVENTIONAL BALLOON

FIELD OF THE INVENTION

This invention generally relates to cardiovascular procedures such as angioplasty, stent deployment and intramural drug delivery, and more particularly to balloon catheters which are especially useful in medical dilatation procedures. More specifically, this invention relates generally to a novel polymer blend that can be extruded, molded, or otherwise formed into articles of manufacture having certain desired characteristics. As examples, the polymer blend of the invention can be processed to form medical catheters and more particularly concerns a balloon material for medical balloon dilatation catheters made from blends having a first glass transition temperature polymer component, and a second glass transition temperature polymer component. The balloon material can also include a third compatibilizing polymer component. While the invention herein relates generally to polymer blends, it will be discussed in terms of preferred end uses in medical devices such as catheters and dilatation balloons. The subsequent discussion is not meant to be limiting and is by way of examples and preferred uses.

BACKGROUND OF THE INVENTION

Catheters with distally mounted balloons are well known for their usefulness in medical applications and in particular interventional procedures, for opening blood vessels or other passageways in the body that may be blocked by obstructions or stenosis. Dilatation catheters are generally formed from thin, flexible tubing having an inflatable balloon at or near a distal tip of the tubing that can be inflated with fluid pressure communicated to the balloon through a lumen of the tubing. In a typical angioplasty procedure, the balloon dilatation catheter is passed through the vasculature to the location of a stenosis in an artery, and the balloon is inflated to a predetermined size and shape to open the blocked artery. Balloon catheters are not limited in their use to the relief of arterial stenosis but have been found useful in many medical applications involving not only insertion into blood vessels but also involving insertion into a variety of body cavities.

It is desirable for balloons of balloon catheters to be capable of inflating to a diameter of typically five to six times their uninflated diameter in order to be able to open an obstructed vessel or deploy a stent prosthesis within a vessel. Other desirable properties of balloons for such interventional procedures include superior strength, softness, flexibility together with a thin, low profile which are important for achieving the performance characteristics necessary to fold the balloon in an uninflated state. This uninflated configuration is important for achieving acceptable tracking and crossing or recrossing the area of the obstruction or stenosis in a vessel. In addition, properties of burst strength, compliance, and fatigue have been increasingly important in the continuing effort to create thinner, lower profile balloons for interventional procedures with the ability to track and cross or recross increasingly obstructions in relatively narrow passages of distal vessels. For purposes of this description, the ability to cross is defined as the ability of a balloon of a balloon dilatation catheter to pass through a stenosis; the ability to recross is defined as the ability of the balloon of a balloon dilatation catheter to pass through a stenosis more than once, or to pass through more than one stenosis; and the ability to track is defined as the ability of the balloon of a balloon dilatation catheter to pass over a guidewire through the tortuous curves of the vasculature, in being guided to and from the location of a stenosis.

Polymeric materials that have been used for making medical devices, catheters, dilatation catheters, and balloons for balloon dilatation catheters include polyethylene, polyolefins, polyvinyl chloride, polyester, polyimide, polyethylene terephthalate (PET), polyamides, nylon, and the like. Also included among the known materials disclosed in patents are ethylene-butylene-styrene block copolymers admixed with low molecular weight polystyrene and, optionally, polypropylene, and similar compositions employing butadiene or isoprene in place of the ethylene and butylene; copolyesters; thermoplastic rubbers; siliconepolycarbonate copolymers; and ethylene-vinyl acetate copolymers. Balloons made of soft polyolefin or ethylene copolymers materials are typically foldable, and track and cross well, so that they can often be used more than once, and can be used to cross multiple lesions. However, such balloons also commonly have high balloon compliance and low burst strengths, with ratings of rated burst pressure of about 8–9 atm, and a mean burst pressure of about 10–15 atm. Balloons made from polyethylene terephthalate (PET) are commonly stronger, with a higher rated burst pressure of about 14–18 atm, and a mean burst pressure of about 18–25 atm. However, dilatation catheter balloons made of PET are generally stiff, not readily foldable, and are susceptible to acquiring defects from mechanical handling. Dilatation catheter balloons made of PET are also susceptible to pin-hole failures that can cause jet-streaming of pressurized fluid within an artery, and can lead to a dissection of the artery. As a result, to reduce the likelihood of pin-hole failures, clinical applications of balloons made of this type of material have generally been limited to thicker balloons that are commonly limited to a single use, and for crossing a single lesion.

Examples of prior art compositions that may be suitable in forming medical devices such as catheters, dilatation catheters, and balloon materials for use in angioplasty procedures include U.S. Pat. No. 4,753,980 (Deyrup); U.S. Pat. No. 4,172,859 (Epstein); U.S. Pat. No. 4,490,421 (Levy); U.S. Pat. No. 5,091,478 (Saltman); U.S. Pat. No. 5,306,246 (Sahatjian et al.); U.S. Pat. No. 4,254,774 (Boretos); U.S. Pat. No. 4,964,409 (Tremulis); U.S. Pat. No. 5,017,325 (Jackowski et al.); U.S. Pat. Nos. 4,093,484 (Harrison et.al.); U.S. Pat. No. 4,154,244 (Becker et. al.); and U.S. Pat. No. 4,254,774 (Boretos), all of which are incorporated herein by reference. These references are presented by way of example only and are not intended to be exhaustive of the prior art.

It would be desirable to provide a urethane polymeric blend for balloons for balloon dilatation catheters with a combination of the best features of the softer balloon materials and the stronger balloon materials, including good flexibility, folding, track, cross and recross, with a thin, low profile, high resistance to fatigue, low compliance, and high burst strength, with a lower susceptibility to defects through mechanical handling, and a lower susceptibility to pin-hole defects, compared with balloons made from PET. The present invention meets these needs.

Another object is to provide such balloons which, because of their flexibility and thin walls, are more readily collapsible and more easily transportable in the body.

It is also an object of the invention to provide such balloons which exhibit very little elongation or creep radially, collectively referred to herein as radial expansion, when inflated to the pressure necessary to perform the desired medical procedure.

A further object is to provide such balloons which, because of their superior physical properties, can be used in medical procedures with a greater probability of success.

Another object is to provide such balloons which, because of their superior physical properties, can be used in medical procedures such as a stent deployment balloon.

Still another object is to provide a process for fabricating such balloons.

These and other objects will become apparent from the following discussion of the invention.

SUMMARY OF THE INVENTION

Briefly, and in general terms, the present invention provides for a balloon material or catheter formed from a blend of polymeric components that has surprisingly high rated and mean burst pressure characteristics, low compliance and excellent fatigue resistance, along with excellent folding and performance characteristics, such as track and cross or recross, allowing for construction of dilatation catheter balloons with the ability to cross multiple lesions.

The principal novelty in the balloons and balloon catheters of the present invention lies in the use of a blended composition of a first polyurethane component having a first glass transition temperature range or a first Shore Hardness range and a second polyurethane component having a second glass transition temperature range or a second Shore Hardness range.

The urethane polymer blend can be employed to fabricate catheter balloons which have various characteristics. For example, one subgroup of the invention can be used to form a compliant catheter balloon. A second embodiment of the invention can be used to fabricate a semi-compliant balloon. A third embodiment of the invention can be used to fabricated a non-compliant balloon.

The urethane polymer blend is fabricated by standard techniques that employ various degrees of heat and physical mixing apparatuses, such as a twin screw extruder machine, to form the compatible polymer blend.

The urethane polymer blend is used to fabricate a balloon for a catheter assembly from extruded tubular materials. For example, a tubular material comprising the urethane blend can be positioned in a balloon mold made of aluminum or similar material which has the shape of the desired balloon geometry. Fabricating the balloon is accomplished in various stages, which includes heating, a first stretching, pressurizing, a second stretching, and cooling steps.

These and other advantages of the invention will become more apparent from the following detailed description thereof and the accompanying exemplary drawings.

BRIEF DESCRIPTION OF THE DRAWINGS

FIG. 4 displays, in partial cross section, another embodiment of the balloon and attached catheter, more specifically, an over-the-wire catheter version.

FIG. 5 shows, in partial cross section, another embodiment of the balloon and attached catheter, more specifically, a rapid exchange catheter version.

DESCRIPTION OF THE PREFERRED EMBODIMENT

Figure 1:
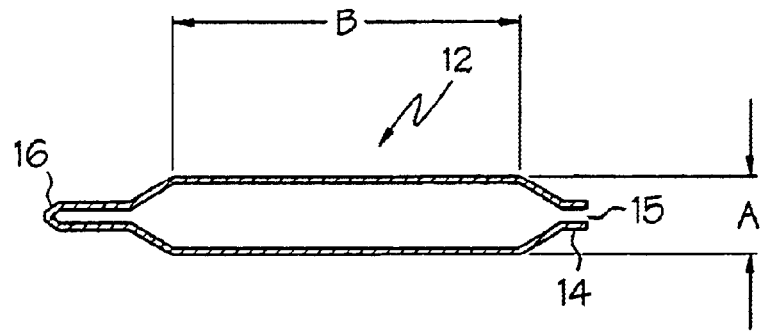
FIG. 1 displays a cross section of a typical catheter balloon in accordance with the present invention.

The invention resides in an improved balloon having an unusual combination of physical properties and which is especially useful in medical dilatation procedures. The invention also resides in a process for fabricating such balloons, and in a dilatation balloon catheter comprising such an improved balloon.

The invention accordingly provides for the balloon material or catheter formed from a blend composition of a first polyurethane component having a first glass transition temperature range or a first Shore Hardness range and a second polyurethane component having a second glass transition temperature range or a second Shore Hardness range.

Provided below is a table demonstrating three subgroups of the present invention; a compliant, semi-compliant, and non-compliant balloon, each fabricated from an urethane blend formulated from a plurality of urethane polymer groups. For each catheter balloon subgroup, a percent weight range (percent) of a first urethane polymer having a first glass transition temperature range ($T_g$ range) or hardness (Shore D) range and second weight percent range (percent) of a second urethane polymer having a second glass transition temperature range ($T_g$ range) or hardness (Shore D) range is combined to form a blended urethane balloon material having a blended glass transition range ($T_{gb}$ range).

| Balloon Nominal OD to Rated OD | Compound | Tg Range (° C.) | Percent | Tgb Range | D Range |
|---|---|---|---|---|---|
| Compliant (Soft) >20% | A | −37°–10° | 50–95 | =22°–26° | 45–70 D |
|  | C | 20°–31° | 5–50 |  | 54–78 D |
| Semi-Compliant 9–20% | A | 0°–10° | 70–90 | =26°–42° | 55–75 D |
|  | B | 55°–70° | 10–30 |  | 70–85 D |
| Non-Compliant <9% | A | 0°–10° | 15–30 | =43°–90° | 70–85 D |
|  | D | 65°–100° | 70–85 |  | 75–87 D |

Illustrative of polyurethanes which am available commercially include materials 1) from the polymer division of Bayer Corporation, under the trademark TEXIN, thermoplastic polyester and polyether based polyurethanes, a particularly preferred species for use in the present invention which is designated as TEXIN 270, a thermoplastic polyester based polyurethane, and represented as compound A in the table above, 2: from BF Goodrich, under the trademark Estane® 5706 and 5715, thermoplastic polyester based polyurethanes and represented as compounds B and C, respectively, in the table above, and 3) from Dow Chemical Company, under the trademark ISOPLAST, thermoplastic segmented polyurethanes, a particularly preferred species designated 2510.

The polyurethane materials above are examples that have the required glass transition temperatures which function to allow mechanical blending that results in the compatible urethane polymer blend with the desired performance characteristics. It is contemplated that other urethane polymers or other urethane manufacturers can replace these specific examples to fabricate the compatible urethane polymer blend with the desired performance characteristics. Therefore, it is to be understood that these examples are given for purposes of illustration only and are not to be construed as limiting.

The urethane polymer blend is fabricated by standard techniques that employ various degrees of heat and physical mixing apparatuses, such as twin screw extruding machinery, to form the compatible urethane polymer blend.

During the mechanical mixing of the urethane polymers, a heat is applied to facilitate formation of the invention urethane blend. This heat process is conducted at a temperature of approximately 250 degrees Fahrenheit to 600 degrees Fahrenheit, and preferably from 390 degrees Fahrenheit to 490 degrees Fahrenheit.

It is already known that the preparation of polymer blends can be accomplished by: (i) mechanical mixing, (ii) dissolution in co-solvent then film casting, freeze or spray drying, (iii) fine powders mixing, (iv) use of monomer(s) as solvent for another blend component then ploymerization as in interpenetrating network's (IPN's) manufacture, and (vi) diverse other methods of IPN technology.

For economic reasons, mechanical blending predominates. However, it is important that certain parameters are optimized to achieve the final performance of the blend.

The requirements for an ideal compounder/mixer are simple: (i) uniformity of shear and elongational stress field, (ii) flexible control of uniform temperature, pressure and residence time, (iii) capability for homogenization of liquids with large difference in rheological properties, (iv) efficient homogenization before onset of degradation, and (v) flexibility for change of mixing parameters in a controllable manner. Unfortunately, as the requirements are simple, the designing of a mixer to fulfill them is difficult. In a standard configuration, the single screw extruder is a poor mixer. Due to "dead spaces," the single screw extruders are inherently unsuitable for reactive blending. However, there are several mixing screw designs, barrel groves and add-on mixing devices such as motionless or CTM mixers which facilitate blend preparation, particularly in systems containing a large quantity of a compatibilizer.

More expensive but easier to control is the twin screw extruder which is the preferred method for fabricating the urethane blend invention. Due to modular design, with many types of elements fulfilling different functions, the twin screw extruder can be optimized for specific polymeric blends. The ratio of dispersive to distributive mixing can be adjusted and the width of the residence time can be controlled. As a result, the blend quality and run-to-run reproducibility are satisfactory.

The balloons and balloon catheters employing the polyurethane blend invention are prepared in a conventional manner using conventional equipment but employing the particular type of compatible polyurethane blends discussed above. For example, in producing a typical dilatation balloon of the invention shown overall as 12 in cross-section in FIG. 1, a tubular member (not shown) having a wall thickness of about 0.05 mm to about 0.5 mm and an internal diameter of about 0.8 mm to about 10 mm is formed by extrusion of the aforesaid compatible polyurethane blend using conventional melt extrusion equipment. One end of the tube is then inserted into a mold having an internal configuration corresponding to the external configuration of the desired balloon. The tubular member is pinched off at one end (16), the mold is heated above the softening temperature of the polyurethane blend (in the range of about 60 degree C. to about 150 degree C.) and a suitable fluid such as nitrogen is used to pressurize and inflate the softened portion of the tube and force the walls thereof into contact with the walls of the mold.

The actual dimensions of the balloon (12) will depend upon the particular dilatation procedure for which the balloon and any attached catheter are to be employed. In general, where the balloon is to be used in angioplasty, the external diameter (A) of the balloon will be of the order of about 2 mm to about 25 mm. The overall length (B) of the inflated portion will be of the order of about 10 mm to about 150 mm. The walls of the balloon will have an average thickness in the range of about 0.01 mm to about 0.2 mm depending in part on the pressures to which the balloon is to be inflated in actual use. However, it is to be understood that these dimensions are given for purposes of illustration only and are not to be construed as limiting.

Figure 2:
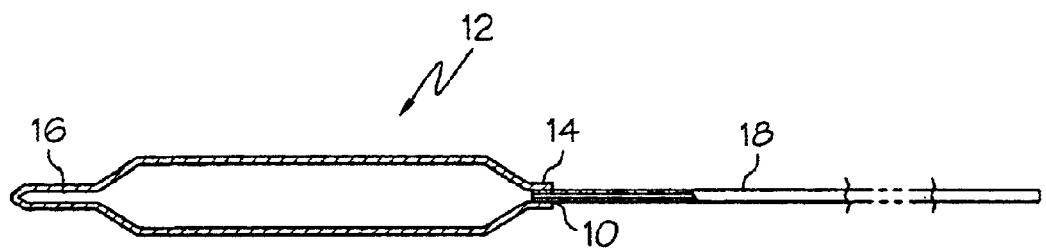
FIG. 2 displays, in partial cross section, a balloon and an attached catheter in accordance with the present invention.

FIG. 2 illustrates in cross-section a balloon of the invention as shown in FIG. 1 mounted on the distal end (10) of catheter (18). The catheter is formed from conventional polymeric materials employed in the fabrication of catheters. Illustrative such as any of the polymeric materials including, but not limited to, polyvinyl chloride, styrenic polymers such as polyacrylates, polyolefins, polyamides, polyesters, fluoropolymers, silicones, and the like conventionally employed in the art to prepare catheters, can be employed to fabricate the catheter (18) by extrusion and like means. The union of the balloon (12) and the distal end (10) of catheter (18) is achieved by inserting the distal end (10) into the balloon opening (15) to form an overlap with the proximal balloon neck (14) of the order of about 2 mm and thereafter sealing the abutting surfaces to each other using heat welding, solvent welding, ultrasonic welding, hot melt bonding, adhesive bonding using one or two part solid adhesives, and like conventional techniques.

In the embodiment shown in FIG. 2, the end (10) of catheter (18) is inserted into the open end (15) of balloon (12). As will be readily apparent to one skilled in the art, the sealing of the balloon and catheter can also be carried out by employing a catheter with an outside diameter, at least at the end thereof which is to be used in the formation of the seal, such that the end of the catheter can be mounted over the neck (14) of the balloon (12). Sealing of the abutting surfaces is then carried out in the same manner described herein.

Figure 3:
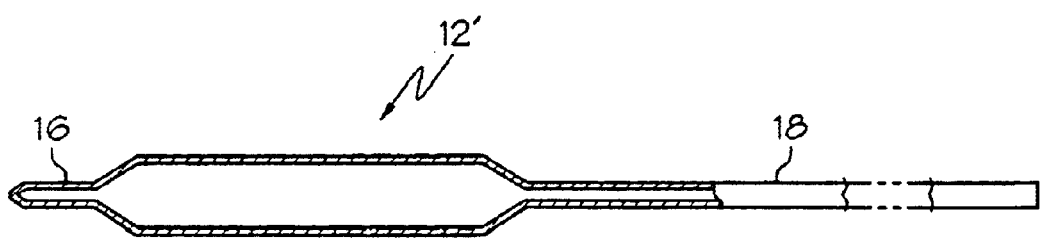
FIG. 3 displays, in partial cross section, another embodiment of the balloon and attached catheter in accordance with the present invention.

FIG. 3 illustrates another mode of forming a balloon with attached catheter in accordance with the invention. In this embodiment the balloon (12') is molded directly onto the end of catheter (18) which latter has itself been fabricated from the particular polyurethane which is used to form the balloons of the invention. The method of molding can be that described above in connection with the embodiment shown in FIG. 1. The end or tip (16) of the balloon (12') in the example shown in FIG. 3, is preferably tapered and rounded at its extremity. The embodiment of FIG. 3 has the advantage that the balloon and catheter are formed as a single, integral unit thus avoiding the necessity to form the balloon and catheter separately and then bond them together.

FIG. 4 shows another example of a balloon shown overall as (12") in accordance with the invention. In this example, a flexible guide wire (32) traverses the length of catheter (19) in sliding engagement therewith and protrudes from the distal tip (30) of the catheter. The protruding tip (36) of the guide wire (32) is rounded. The proximal end (34) of guide wire (32) can be received in a torque device (not shown) or like means conventionally employed in the art for manipulating the guide wire during the medical dilatation procedure for which the balloon catheter is to be employed. Also in this example, the balloon has a proximal neck with opening (24) and a distal neck with opening (26) at each end thereof. A balloon having this configuration is advantageously fabricated from a balloon of the configuration shown in FIG. 1 by removal of the tip (16) after the molding process is completed. The balloon (12") of FIG. 4 is then mounted over catheter (19) by insertion of the tip (30) of catheter (19) into the proximal neck (24) and out through the distal neck (26) so that a predetermined portion (31) of the distal end of the catheter (19) protrudes past the distal end of the balloon. The length of portion (31) can be varied over a wide range depending upon the desired use and method of functioning of the balloon catheter so formed. The abutting surfaces of catheter (19) and necks (24) and (26) of balloon (12") are then bonded as described above. Catheter (19) can be provided with radiopaque bands (28) fabricated from radiopaque materials such as platinum and gold. These radiopaque elements serve to facilitate by x-ray the location of the balloon (12") during a medical dilatation procedure and to ensure that the balloon is located in the desired area of an artery or like vessel or duct before the balloon is inflated.

FIG. 5 shows, in partial cross-section, a modification of the balloon catheter of FIG. 4. In this modification, the flexible guide wire (32) traverses only over a portion of the length of catheter (19) by entering the catheter body at proximal opening or port (50) which continues forward until it protrudes from the distal tip (30) of the catheter. In this design, the shortened catheter/guide wire interaction functions to provide the balloon/catheter invention with rapid exchange capabilities.

As will be obvious to one skilled in the art, the dilatation balloons of the invention can also be employed to replace dilatation balloons in any of the many other types of balloon-catheter combinations, with or without guide wires, currently employed in medical dilatation procedures. The balloons of the invention possess properties which render them especially valuable in carrying out medical dilatation procedures such as angioplasty and the like. Thus, the walls of the balloon are sufficiently thin to allow the balloon to be collapsed by deflation sufficiently to permit passage into and through the artery, vein or like passageway involved in the procedure. However, the walls of the balloon should possess sufficient flexural strength such that 1) the compliant balloon will not expand beyond the originally molded configuration or rated burst pressure under pressures up to about 100 psi, 2) the semi-compliant balloon will not expand beyond the originally molded configuration or rated burst pressure under pressure up to about 150 psi, or 3) the non-compliant balloon will not expand beyond the originally molded configuration or rated burst pressure under pressures up to about 180 psi. Hence there is no problem of uncontrolled expansion or danger of bursting under pressure conditions routinely involved in angioplasty and like procedures. Further, because the balloons can be integrally molded on catheters of the same material as that used for the balloon or, alternatively, can be securely bonded without difficulty to other materials employed in the formation of catheters, there is little or no risk of rupture at the junction of balloon and catheter while the dilatation procedure is being carried out. Accordingly, the balloons and balloon catheters of the present invention represent a significant advance in the art.

What is claimed is:

1. A catheter balloon material formed from a blend of polymeric components, comprising:
   approximately 50–95% by weight of the total blend of a first urethane polymeric component, said first urethane polymer having a glass transition temperature in the range of −37 to 10 degrees C., and about 5–50% by weight of the total blend composition of a second urethane polymer component having a glass transition temperature in the range of 20 to 31 degrees C.

2. The catheter balloon material as recited in claim 1, wherein said blend has a glass transition temperature in the range of 22 to 26 degrees C.

3. A catheter balloon material formed from a blend of polymeric components, comprising:
   approximately 70–90% by weight of the total blend of a first methane polymeric component, said first urethane polymer having a glass transition temperature in the range of −37 to 10 degrees C., and about 10–30% by weight of the total blend composition of a second urethane polymer component having a glass transition temperature in the range of 20 to 31 degrees C.

4. The catheter balloon material as recited in claim 3, wherein using said blend in fabricating a catheter balloon results in a semi-compliant balloon.

5. The catheter balloon material as recited in claim 3, wherein said blend has a glass traction temperature in the range of 26 to 42 degrees C.

6. The catheter balloon material as recited in claim 4, wherein said semi-compliant balloon expands its nominal diameter between 9 to 20% when internal pressure is increased to its rated burst pressure.

7. A catheter balloon material formed from a blend of polymeric components, comprising:
   approximately 15–30% by weight of the total blend of a first urethane polymeric component, said first urethane polymer having a glass transition temperature in the range of 0 to 10 degrees C., and about 70–85% by weight of the total blend composition of a second urethane polymer component having a glass transition temperature in the range of 65 to 100 degrees C.

8. The catheter balloon material as recited in claim 7, wherein said blend has a glass transition temperature in the range of 43 to 90 degrees C.

9. A catheter balloon formed from a polymeric composition comprising about 15–30% by weight of the total composition of a first urethane polymeric component, said first urethane polymer having a glass transition temperature in the range of 0 to 10 degrees C., and about 70–85% by weight of the total composition of a second urethane polymer component having a glass transition temperature in the range of 65 to 100 degrees C.

10. The catheter balloon of claim 9 wherein said catheter balloon is non-compliant.

11. The catheter balloon as recited in claim 10, where said non-compliant balloon expands its nominal diameter less than or equal to 9% when internal pressure is increased to its rated burst pressure.

12. A catheter balloon material formed from a blend of polymeric components, comprising:
   approximately 50–95% by weight of the total blend of a first urethane polymeric component, said first urbane polymer having a Shore D Hardness in the range of 45 to 70, and about 5–50% by weight of the total blend composition of a second urethane polymer component having a Shore D Hardness in the range of 54 to 78.

13. A catheter balloon formed firm a polymeric composition comprising about 50–95% by weight of the total composition of a first urethane polymeric component, said first urethane polymer having a Shore D Hardness in the range of 45 to 70, and about 5–50% by weight of the total composition of a second urethane polymer component having a Shore D Hardness in the range of 54 to 78.

14. The catheter balloon of claim 13 wherein said catheter balloon is compliant.

15. The catheter balloon as recited in claim 14, where said compliant balloon expands its nominal diameter equal to or greater than 20% when internal pressure is increased to its rated burst pressure.

16. A catheter balloon material formed from a blend of polymeric components, comprising:

approximately 70–90% by weight of the total blend of a first urethane polymeric component, said first urethane polymer having a Shore D Hardness in the range of 55 to 75, and about 10–30% by weight of the total blend composition of a second urethane polymer component having a Shore D Hardness in the range of 70 to 85.

17. A catheter balloon formed from a polymeric composition comprising about 70–90% by weight of the total composition of a first urethane polymeric component, said first urethane polymer having a Shore D Hardness in the range of 55 to 75, and about 10–30% by weight of the total composition of a second urethane polymer component having a Shore D Hardness in the range of 70 to 85.

18. The catheter balloon of claim 17 wherein said catheter balloon is semi-compliant.

19. The catheter balloon as recited in claim 18, where said semi-compliant balloon expands its nominal diameter between 9 to 20% when internal pressure is incased to its rated burst pressure.

20. A catheter balloon material formed from a blend of polymeric components, comprising:
approximately 15–30% by weight of the total blend of a first urethane polymeric component, said first urethane polymer having a Shore D Hardness in the range of 70 to 85, and about 70–85% by weight of the total blend composition of a second urethane polymer component having a Shore D Hardness in the range of 75 to 87.

21. A catheter balloon formed from a polymeric composition comprising about 15–30% by weight of the total composition of a first urethane polymeric component, said first urethane polymer having a Shore D Hardness in the range of 70 to 85, and about 70–85% by weight of the total composition of a second urethane polymer component having a Shore D Hardness in the range of 75 to 87.

22. The catheter balloon of claim 21 wherein said catheter balloon is non-compliant.

23. The catheter balloon as recited in claim 22, where said non-compliant balloon expands its nominal diameter less than or equal to 9% when internal pressure is increased to its rated burst pressure.

24. A catheter balloon formed from a polymeric composition comprising about 50–95% by weight of the total composition of a first urethane polymeric component, said first urethane polymer having a glass transition temperature in the range of −37 to 10 degrees C., and about 5–50% by weight of the total composition of a second urethane polymer component having a glass transition temperature in the range of 20 to 31 degrees C.

25. The catheter balloon of claim 1 wherein said balloon is a compliant balloon.

26. A catheter balloon formed from a polymeric composition comprising about 70–90% by weight of the total composition of a first urethane polymeric component, said first urethane polymer having a glass transition temperature in the range of 0 to 10 degrees C., and about 10–30% by weight of the total composition of a second urethane polymer component having a glass transition temperature in the range of 55 to 70 degrees C.

27. The catheter balloon of claim 26 wherein said catheter balloon is semi-compliant.

* * * * *